(12) United States Patent
Yoon et al.

(10) Patent No.: US 11,550,440 B2
(45) Date of Patent: Jan. 10, 2023

(54) FLEXIBLE TOUCH SENSING SYSTEM AND METHOD WITH DEFORMABLE MATERIAL

(71) Applicant: Purdue Research Foundation, West Lafayette, IN (US)

(72) Inventors: Sang Ho Yoon, West Lafayette, IN (US); Karthik Ramani, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 17/549,860

(22) Filed: Dec. 13, 2021

(65) Prior Publication Data

US 2022/0107709 A1 Apr. 7, 2022

Related U.S. Application Data

(63) Continuation of application No. 16/544,891, filed on Aug. 19, 2019, now Pat. No. 11,199,936.

(60) Provisional application No. 62/719,540, filed on Aug. 17, 2018.

(51) Int. Cl.
*G06F 3/044* (2006.01)
*G06F 3/041* (2006.01)

(52) U.S. Cl.
CPC .......... *G06F 3/0447* (2019.05); *G06F 3/0416* (2013.01); *G06F 3/0443* (2019.05)

(58) Field of Classification Search
CPC ... G06F 3/04166; G06F 3/0443; G06F 3/0447
See application file for complete search history.

(56) References Cited

U.S. PATENT DOCUMENTS

| 8,175,821 | B2 | 5/2012 | Nagakubo et al. |
| 9,341,659 | B2 | 5/2016 | Poupyrev et al. |
| 9,448,066 | B2 | 9/2016 | Follmer et al. |
| 9,482,622 | B2 | 11/2016 | Sato et al. |
| 9,612,690 | B2 | 4/2017 | Zirkl et al. |

(Continued)

OTHER PUBLICATIONS

A. Boyle et al. "Shape Deformation in Two-Dimensional Electrical Impedance Tomography," in IEEE Transactions on Medical Imaging, vol. 31, No. 12, pp. 2185-2193, Dec. 2012, doi: 10.1109/TMI.2012.2204438.

(Continued)

*Primary Examiner* — Robin J Mishler
(74) *Attorney, Agent, or Firm* — Maginot, Moore & Beck LLP (57) ABSTRACT

A sensing system includes a stretchable base material, a plurality of electrodes, a capacitive sensing channel and a controller. The stretchable base material has a resistance distribution that changes in response to being mechanically deformed as a result of a human body contact. The base material has a rebound elasticity. The electrodes are attached to a perimeter of the base material, the capacitive sensing channel is attached to the base material. The controller is operatively connected to the plurality of electrodes and the capacitive sensing channel. The controller is configured to measure instantaneous voltage measurements from the plurality of electrodes, and determine whether the base material is mechanically deformed based on the instantaneous voltage measurements using a support vector machine classifier.

13 Claims, 9 Drawing Sheets

(56) References Cited

U.S. PATENT DOCUMENTS

| | | |
|---|---|---|
| 10,942,596 B2 | 3/2021 | Harrison et al. |
| 2009/0084674 A1 | 4/2009 | Holzhacker et al. |
| 2010/0049450 A1 | 2/2010 | Nagakubo et al. |
| 2010/0259503 A1 | 10/2010 | Yanase et al. |
| 2012/0157827 A1 | 6/2012 | Ross et al. |
| 2014/0365009 A1* | 12/2014 | Wettels ............ B25J 19/023 700/258 |
| 2017/0097684 A1 | 4/2017 | Lien |
| 2018/0116559 A1 | 5/2018 | Otaka et al. |
| 2019/0227667 A1* | 7/2019 | Harrison ............ G06F 3/0416 |
| 2020/0057531 A1 | 2/2020 | Yoon et al. |
| 2020/0183514 A1 | 6/2020 | Ramani et al. |

OTHER PUBLICATIONS

International Search Report corresponding to International Patent Application No. PCT/US2018/33556, dated Aug. 9, 2018 (2 pages).

Laput, G., Brockmeyer, E., Hudson, S. E., & Harrison, C. (Apr. 2015). Acoustruments: Passive, acoustically-driven, Interactive controls for handheld devices. In Proceedings of the 33rd Annual ACM Conference on Human Factors in Computing Systems (pp. 2161-2170). ACM.

Zhang, Y., & Harrison, C. (Nov. 2015). Tomo: Wearable, low-cost electrical impedance tomography for hand gesture recognition. In Proceedings of the 28th Annual ACM Symposium on User Interface Software & Technology (pp. 167-173). ACM.

Vanderloock, K., Vanden Abeele, V., Suykens, J. A., & Geurts, L. (Oct. 2013). The skweezee system: enabling the design and the programming of squeeze interactions. In Proceedings of the 26th annual ACM symposium on User interface software and technology (pp. 521-530). ACM.

Dementyev, A., & Paradiso, J. A. (Oct. 2014). WristFlex: low-power gesture input with wrist-worn pressure sensors. In Proceedings of the 27th annual ACM symposium on User interface software and technology (pp. 161-166). ACM.

Parzer, P., Sharma, A., Vogl, A., Steimle, J., Olwal, A., & Haller, M. (Oct. 2017). SmartSleeve: Real-time Sensing of Surface and Deformation Gestures on Flexible, Interactive Textiles, using a Hybrid Gesture Detection Pipeline. In Proceedings of the 30th Annual ACM Symposium on User Interface Software and Technology (pp. 565-577). ACM.

Weigel, M., Lu, T., Bailly, G., Oulasvirta, A., Majidi, C., & Steimle, J. (Apr. 2015). Iskin: flexible, stretchable and visually customizable on-body touch sensors for mobile computing. In Proceedings of the 33rd Annual ACM Conference on Human Factors in Computing Systems (pp. 2991-3000). ACM.

Schmitz, M., Steimle, J., Huber, J., Dezfuli, N., & Muhlhauser, M. (May 2017). Flexibles: Deformation-Aware 3D-Printed Tangibles for Capacitive Touchscreens. In Proceedings of the 2017 CHI Conference on Human Factors in Computing Systems (pp. 1001-1014). ACM.

Wessely, M., Tsandilas, T., & Mackay, W. E. (Oct. 2016). Stretchis: Fabricating highly stretchable user Interfaces. In Proceedings of the 29th Annual Symposium on User Interface Software and Technology (pp. 697-704). ACM.

Weigel, M., Nittala, A. S., Olwal, A., & Steimle, J. (May 2017). SkinMarks: Enabling Interactions on Body Landmarks Using Conformal Skin Electronics. In Proceedings of the 2017 CHI Conference on Human Factors in Computing Systems (pp. 3095-3105). ACM.

Yoon, S. H., Huo, K., Zhang, Y., Chen, G., Paredes, L., Chidambaram, S., & Ramani, K. (Oct. 2017). iSoft: A Customizable Soft Sensor with Real-time Continuous Contact and Stretching Sensing_ In Proceedings of the 3oth Annual ACM Symposium on User Interface Software and Technology (pp. 665-678). ACM.

Chossat, J.B., Shin, H. S., Park, Y. L., & Duchaine, V. (2015). Soft tactile skin using an embedded ionic liquid and omographic imaging. Journal of Mechanisms and Robotics, 7(2), 021008.

Ramos, G., Boulos, M., & Balakrishnan, R. (Apr. 2004). Pressure widgets. In Proceedings of the SIGCHI conference on Human factors in computing systems (pp. 487-494). ACM.

Lee, H., Kwon, D., Cho, H., Park, I., & Kim, J. (2017). Soft Nanocomposite Based Multi-point, Multi-directional Strain Mapping Sensor Using Anisotropic Electrical Impedance Tomography. Scientific reports, 7.

Roberts, P., Damian, D_ D., Shan, W., Lu, T., & Majidi, C. (May 2013). Soft-matter capacitive sensor for measuring shear and pressure deformation. In Robotics and Automation (ICRA), 2013 IEEE International Conference on (pp. 3529-3534). IEEE.

Chien, C. Y., Liang, R. H., Lin, L. F., Chan, L., & Chen, B. Y. (Nov. 2015). Flexibend: Enabling interactivity of multi-part, deformable fabrications using single shape-sensing strip. In Proceedings of the 28th Annual ACM Symposium on User Interface Software & Technology (pp. 659-663). ACM.

Nguyen, V. P., Yoon, S. H., Verma, A., & Ramani, K. (Sep. 2014). Bendid: Flexible interface for localized deformation recognition. In Proceedings of the 2014 ACM International Joint Conference on Pervasive and Ubiquitous Computing (pp. 553-557). ACM.

Slyper, R., Poupyrev, I., & Hodgins, J. (Jan. 2011) Sensing through structure: designing soft silicone sensors. In Proceedings of the fifth international conference on Tangible, embedded, and embodied interaction (pp. 213-220) ACM.

Sugiura, Y., Inami, M., & Igarashi, T. (Oct. 2012) A thin stretchable interface for tangential force measurement. In Proceedings of the 25th annual ACM symposium on User interface software and technology (pp. 529-536). ACM.

Vogl, A., Parzer, P., Babic, T., Leong, J., Olwal, A., & Haller, M. (May 2017) StretchEBand: Enabling Fabric-based Interactions through Rapid Fabrication of Textile Stretch Sensors. In CHI (pp. 2617-2627).

Shorey, P., & Girouard, A. (May 2017). Bendtroller: An Exploration of In-Game Action Mappings with a Deformable 20 Game Controller. In Proceedings of the 2017 CHI Conference on Human Factors in Computing Systems (pp. 1447-1458). ACM.

Leong, J., Parzer, P., Perteneder, F., Babic, T., Rendl, C., Vogl, A., & Haller, M. (Oct. 2016). proCover: Sensory Augmentation of Prosthetic Limbs Using Smart Textile Covers. In Proceedings of the 29th Annual Symposium on User Interface Software and Technology (pp. 335-346). ACM.

Zhang, Y., Xiao, R., & Harrison, C. (Oct. 2016). Advancing hand gesture recognition with high resolution electrical impedance tomography. In Proceedings of the 29th Annual Symposium on User Interface Software and Technology (pp. 843-850). ACM.

Tawil, S., D., Rye, D., & Velonaki, M. (2012). Interpretation of the modality of touch on an artificial arm covered with an EIT-based sensitive skin. The International Journal of Robotics Research, 31(13), 1627-1641.

Han, X., Seki, H., Kamiya, Y., & Hikizu, M. (2009). Wearable handwriting input device using magnetic field: Geomagnetism cancellation in position calculation. Precision engineering, 33(1), 37-43.

Laput, G., Zhang, Y., & Harrison, C_ (May 2017). Synthetic Sensors: Towards General-Purpose Sensing. In Proceedings of the 2017 CHI Conference on Human Factors in Computing Systems (pp. 3986-3999). ACM.

Brown, B. H., & Seagar, A. D. (1987). The Sheffield data collection system. Clinical Physics and Physiological Measurement, 8(4A), 91.

Haugen, J. E., Tamie, 0., & Kvaal, K. (2000). A calibration method for handling the temporal drift of solid state gas-sensors. Analytica chimica acta, 407(1), 23-39.

Tavakoli, M., Rocha, R., Osorio, L., Almeida, M., de Almeida, A., Ramachandran, V., & Majidi, C. {2017). Carbon doped PDMS: conductance stability over time and implications for additive manufacturing of stretchable electronics. Journal of Micromechanics and Microengineering, 27(3), 035010.

Vauhkonen, M., Lionheart, W.R., Heikkinen, L. M., Vauhkonen, P. J., & Kaipio, J.P. (2001). A MATLAB package for the EI DORS project to reconstruct two-dimensional EIT images. Physiological Measurement, 22(1). 107.

(56) References Cited

OTHER PUBLICATIONS

Adler A., & Guardo, R (1996). Electrical impedance tomography: regularized imaging and contrast detection. IEEE transactions on medical imaging, 15{2), 170-179.

Kildal, J., Paasovaara, S., & Aaltonen, V. (May 2012). Kinetic device: designing interactions with a deformable mobile interface. In CHI'12 Extended Abstracts on Human Factors in Computing Systems {pp. 1871-1876) ACM.

\* cited by examiner

FLEXIBLE TOUCH SENSING SYSTEM AND METHOD WITH DEFORMABLE MATERIAL

CROSS REFERENCE TO RELATED APPLICATION

This application is a continuation of U.S. patent application Ser. No. 16/544,891, filed Aug. 19, 2019, which in turn claims priority to U.S. Provisional Patent Application No. 62/719,540 filed Aug. 17, 2018, both of which are hereby incorporated by reference in their entireties.

BACKGROUND

Stretchable soft sensors have been explored as promising input methods for adding interactions on both rigid and elastic physical objects, smart textiles, shape-changing surfaces, humanoids, and the human body. With a high flexibility and stretchability of the sensors, a wide scope of natural applications have been suggested. Still, the expensive and multi-step fabrication processes hinder production of inexpensive, customized soft sensors. Moreover, such sensors often cannot maintain localization of a sensing point when the material is deformed during a touch interaction. Therefore, improvements are needed in the field.

SUMMARY

By jointly emphasizing fabrication, multi-modality and novel computational methods, the present disclosure provides a single-volume soft-matter sensor that provides multimodal sensing and is able to support and restore contact localization upon and after deformation of the sensing material. The presently disclosed sensor and associated methods allow users to fabricate sensors inexpensively, customize interfaces easily, and deploy them instantly for continuous touch input.

In certain embodiments, the presently disclosed device utilizes carbon-filled liquid silicone rubber, a non-toxic piezoresistive elastomer material. The major hurdle in employing the carbon-filled silicone as an interaction input is the lack of real time sensing capability. This is mainly due to a rebound elasticity of the material, which causes a slow-recovery of the sensing signals after the material deformations that occur during an input event. In the present disclosure, an adaptive multi-sensing process is implemented using an electrical impedance tomography (EIT) process to achieve real-time contact localization and a learning-based support vector machine (SVM) to achieve deformation awareness. The disclosed system is therefore able to update contact localization in the presence of deformation of the sensing material.

By employing the EIT and SVM technique, the presently disclosed system enables a human touch to interface and interact with the sensor via electrodes placed on the material boundary only. In this way, the sensor can be fabricated in a single-volume manner and implemented without invasive wirings or electronics or other elements which have to be fabricated and placed in the interior of the material boundary. No interior elements are required, instead the material itself is used as a sensor. Using the disclosed method provides sensing contact localization and stretching within the sensor material. To this end, users are allowed to perform interactions instantly after deployment without any extra training processes.

Figure 2A:
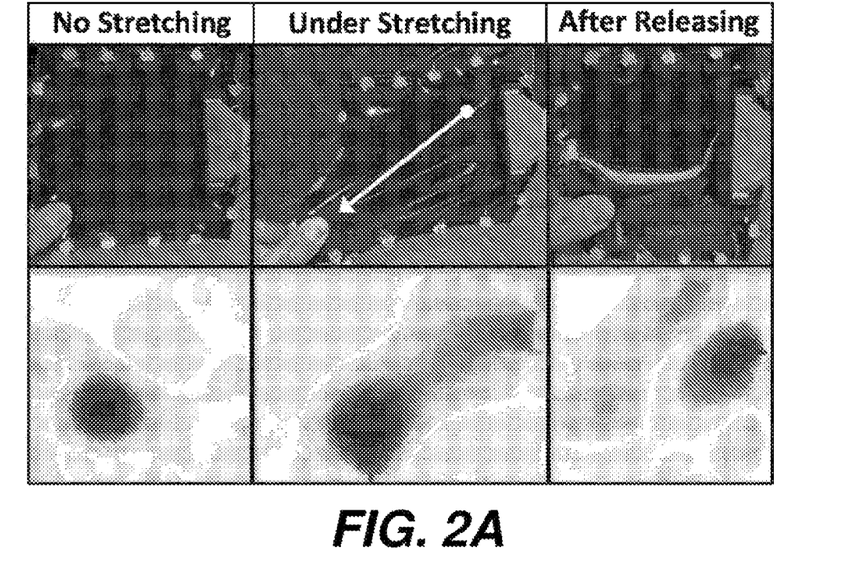
FIG. 2A illustrates a contact localization output for a stretching event without a deformation switch value incorporated.
Figure 2B:
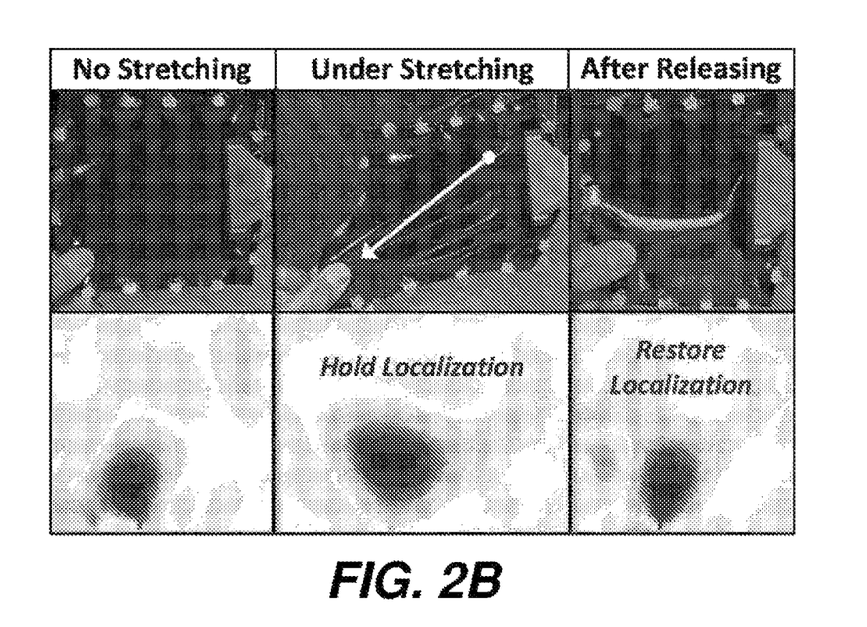
FIG. 2B illustrates a contact localization output for a stretching event with a deformation switch value incorporated.

According to various aspects, a system is provided, comprising a single volume soft sensor capable of sensing real-time continuous contact and stretching. A low-cost and an easy way to fabricate such piezoresistive elastomer-based soft sensors for instant interactions is also provided. An electrical impedance tomography (EIT) technique with SVM learning is employed to estimate changes of resistance distribution on the sensor caused by fingertip contact and determine contact localization even during a material deformation event. The EIT image reconstruction is processed with a difference in resistance measurement ($\Delta V$) which the difference between an instant measurement reading ($V_i$) and a homogeneous baseline reading ($V_H$). A deformation switch value is determined to maintain and restore the contact localization during and after the deformation event. When deformation occurs, the most recent $\Delta V$ before the deformation event occurred is maintained and used during the deformation event. Upon release from the deformation, we updated the homogeneous baseline using $\Delta V$, where $V_H = V_i - \Delta V$. Using the presently disclosed method, the contact localization can be maintained during the deformation and restored after the deformation as shown in FIG. 2B.

This summary is provided to introduce the selection of concepts in a form that is easy to understand the detailed embodiments of the descriptions. The embodiments are then brought together in a final embodiment which described an environment, thereby stressing that each of the embodiments may be viewed in isolation, but also the synergies among them are very significant. This summary is not intended to identify key subject matter or key features or essential features thereof.

BRIEF DESCRIPTION OF THE DRAWINGS

The above and other objects, features, and advantages of various examples will become more apparent when taken in conjunction with the following description and drawings wherein identical reference numerals have been used, where possible, to designate identical features that are common to the figures, and wherein.

DETAILED DESCRIPTION

The term "drawings" used herein refers to drawings attached herewith and to sketches, drawings, illustrations, photographs, or other visual representations found in this disclosure. The terms "I," "we," "our" and the like throughout this disclosure do not refer to any specific individual or group of individuals.

Figure 1A:
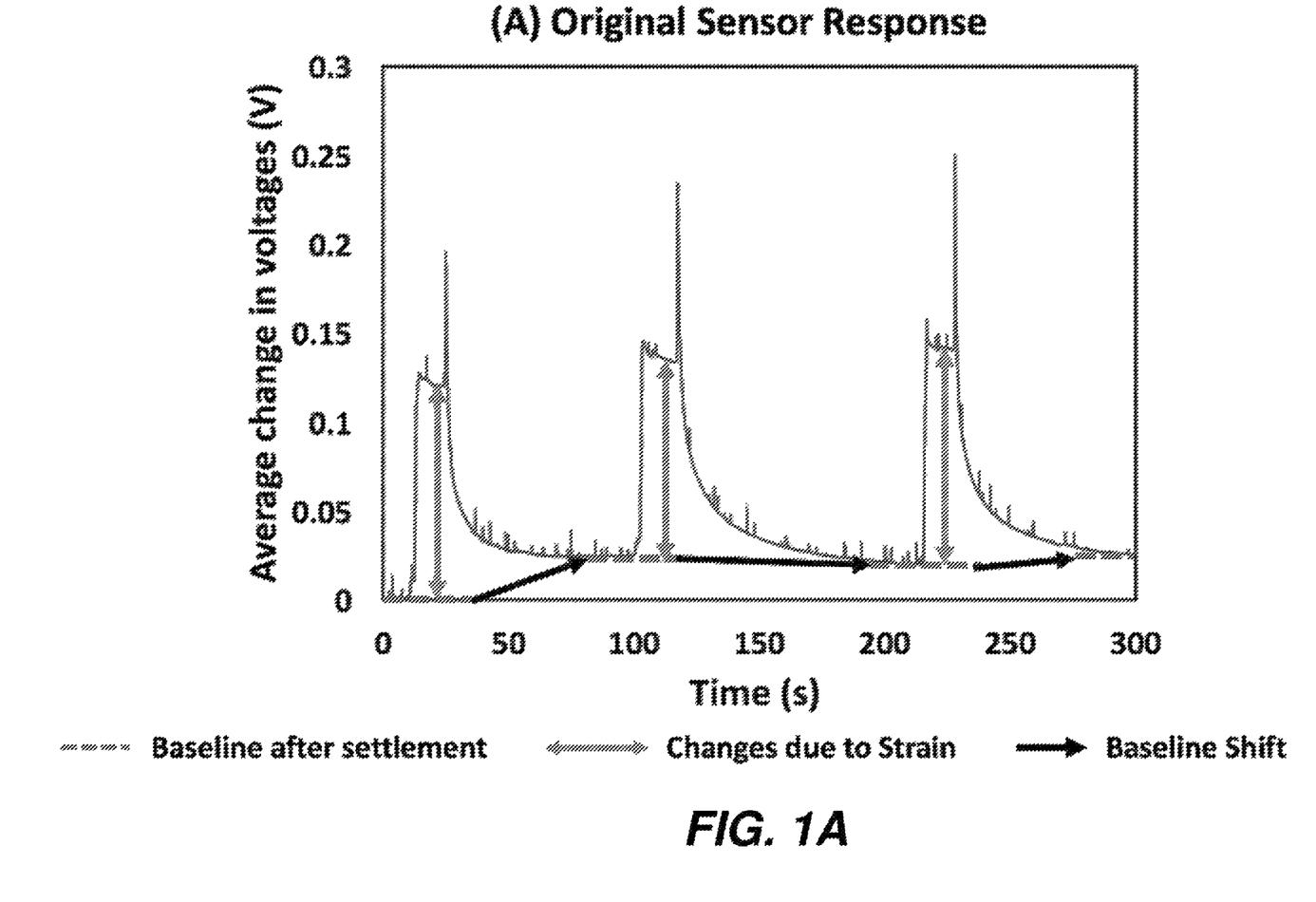
FIG. 1A illustrates a change in sensor output values without dynamic manipulation upon a deformation event.
Figure 1B:
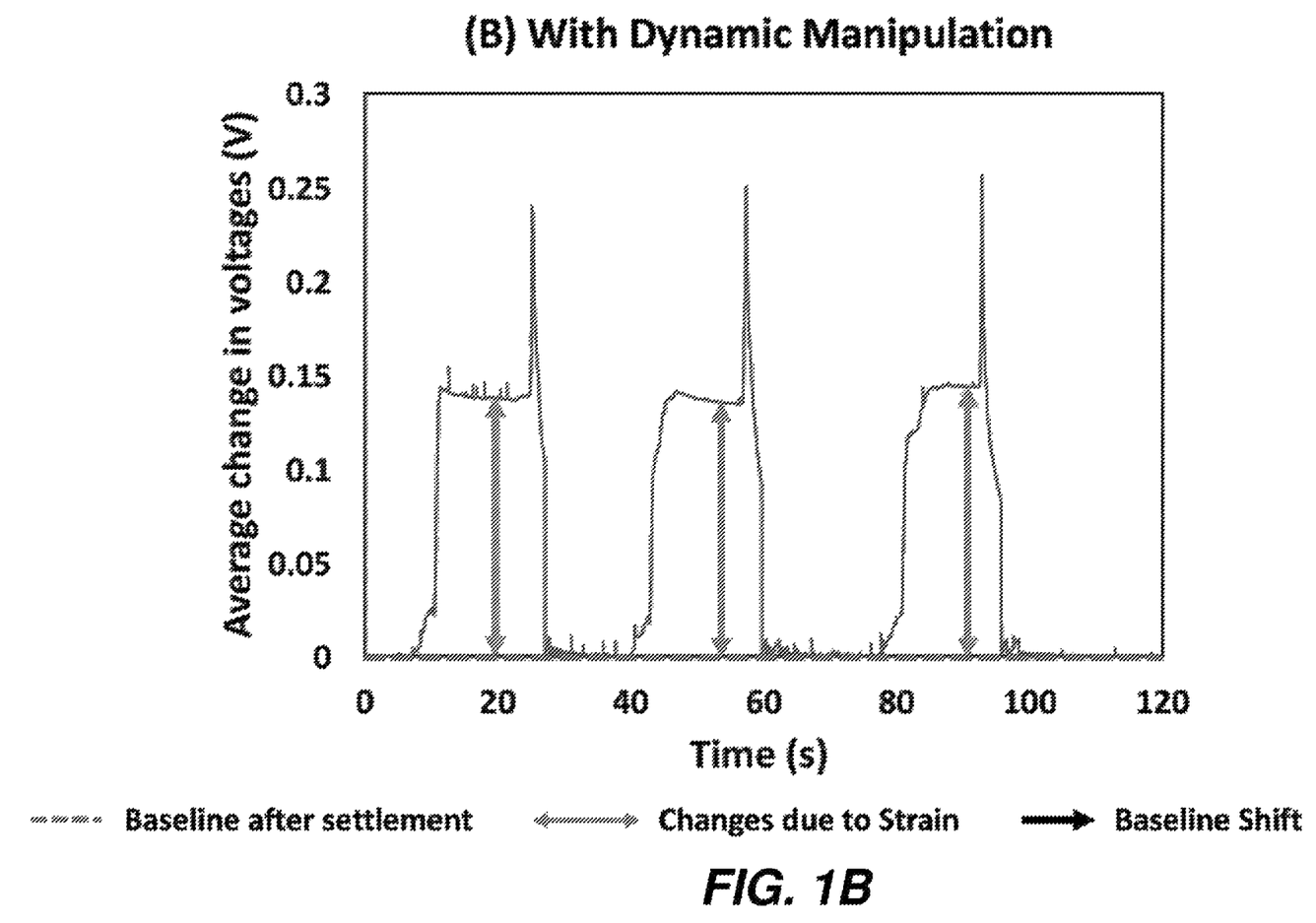
FIG. 1B illustrates a change in sensor output values with dynamic manipulation upon a deformation event.

Sensing performed by the presently disclosed system is based on an EIT technique with an SVM learning process which estimates the resistance distribution of the conductive material using inverse problem analysis based on measurements from the sensor boundary. The difficulty of providing real-time sensing with carbon-filled silicone rubber is due to the material's rebound elasticity (>50%), which causes a long settling time (>10 s) and small shifts in baseline values as shown in FIGS. 1A and 1B. FIG. 1A illustrates a change in sensor output values without dynamic manipulation upon a deformation event. FIG. 1B illustrates a change in sensor output values with dynamic manipulation upon a deformation event.

Figure 3A:
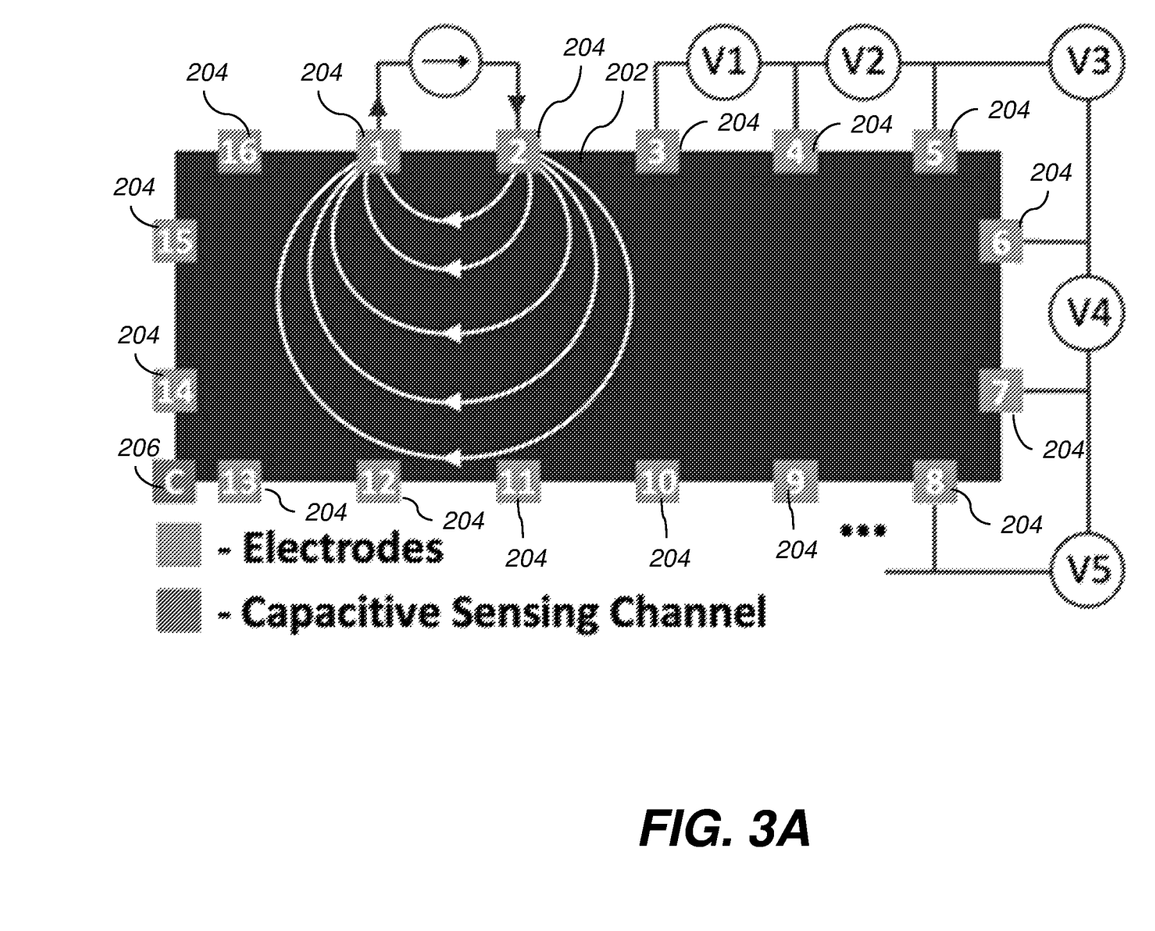
FIG. 3A illustrates a sensor activating the initial sensing electrode pair.
Figure 3B:
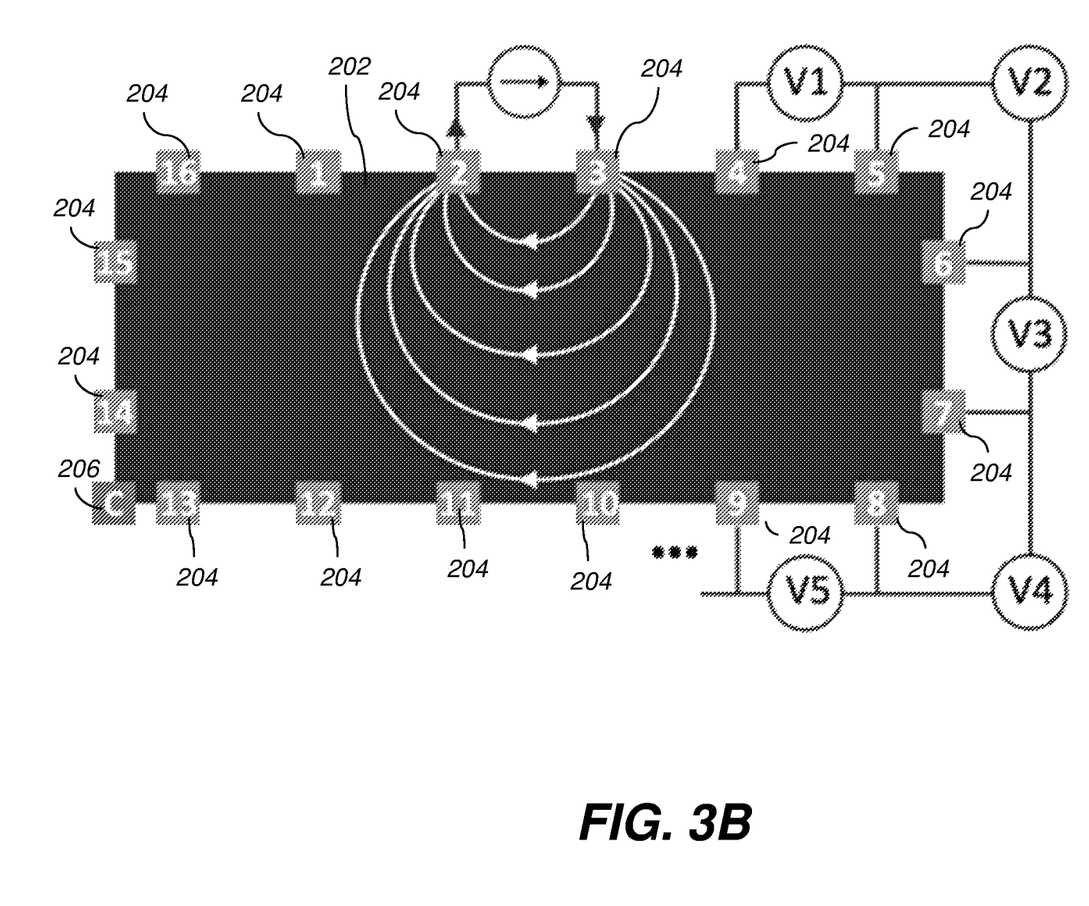
FIG. 3B illustrates a sensor activating a subsequent sensing electrode pair.

The presently disclosed sensing method is based on carbon-filled liquid silicone rubber that changes its resistance distribution upon mechanical deformations. In one example, four-terminal sensing is used to measure resistance since this method reduces the inaccuracy from contact resistances. Unlike matrix tactile sensors where arrays of electrodes are required within the sensing area, the presently disclosed system utilizes sensing electrodes 204 and a capacitive channel 206 coupled to the outer edge of the sensor 202. Then, a Neighboring Method is used where DC current is fed through two adjacent electrodes 202 and the voltage differential is measured successively throughout the adjacent electrode pairs as shown in FIGS. 3A and 3B. FIG. 3A shows the initial sensing electrode pair and FIG. 3B shows the next successive electrode pair sensing.

Figure 4:
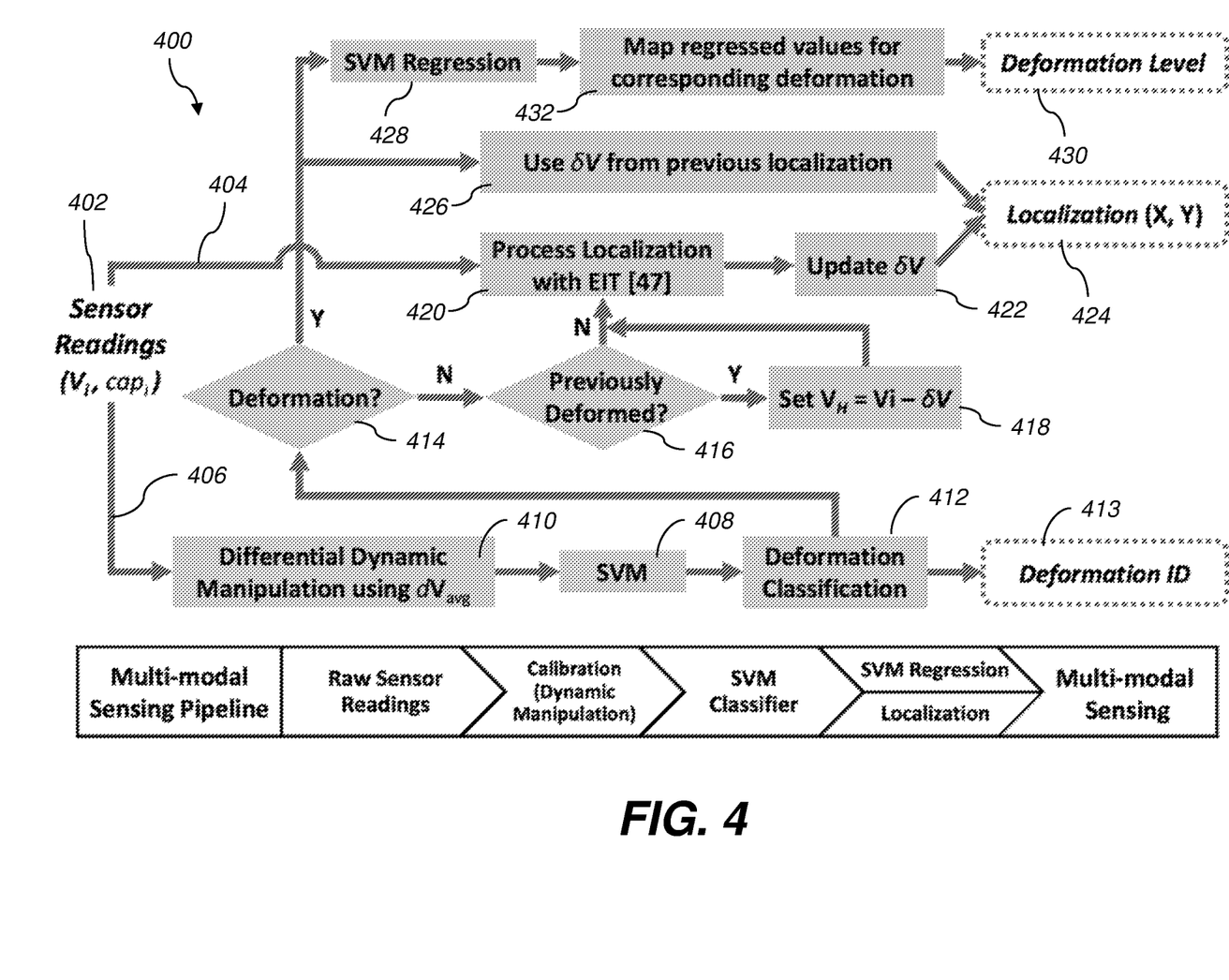
FIG. 4 is a process flowchart illustrating a touch sensing process according to one embodiment.

According to one embodiment, EIT image reconstruction is carried out by comparing the measurements at two different instances. The update method comprises the following steps as shown in FIG. 4:

Raw sensor readings from sensors 204 are fed into EIT channel 404 and SVM channel 406.

Before feeding the sensor values to the SVM classifier (block 408), differential dynamic manipulation (block 410) is applied when the sensor settlement enters the quasi-steady state, i.e., $dV_{avg} < dV_{avg,threshold}$ when $V_{avg} < V_{avg,threshold}$.

The deformation type is classified and assigned a deformation identifier (block 413) using SVM with polynomial kernel (block 412).

If there is "No Deformation," (block 414) the presence of deformation is confirmed in the previous frame (block 416).

If the deformation event exists in the previous frame, $V_H = V_i - \Delta V$ is set to update the homogeneous baseline (block 418). Otherwise, EIT localization (block 420) is processed using the baseline process 500 of FIG. 5 to update $\Delta V$ (block 422) with the current Vi to localize a contact coordinate location in the sensor 202 (block 424).

If any deformation is detected, multiple channels are activated: 1) $\Delta V$ from the most recent localization during "No Deformation" is used (block 426) and a contact coordinate is outputted and 2) the system determines the level of the corresponding deformation (block 430) using SVM regression (block 428) with a polynomial kernel, with the regressed values mapped to corresponding deformation (block 432).

Figure 5:
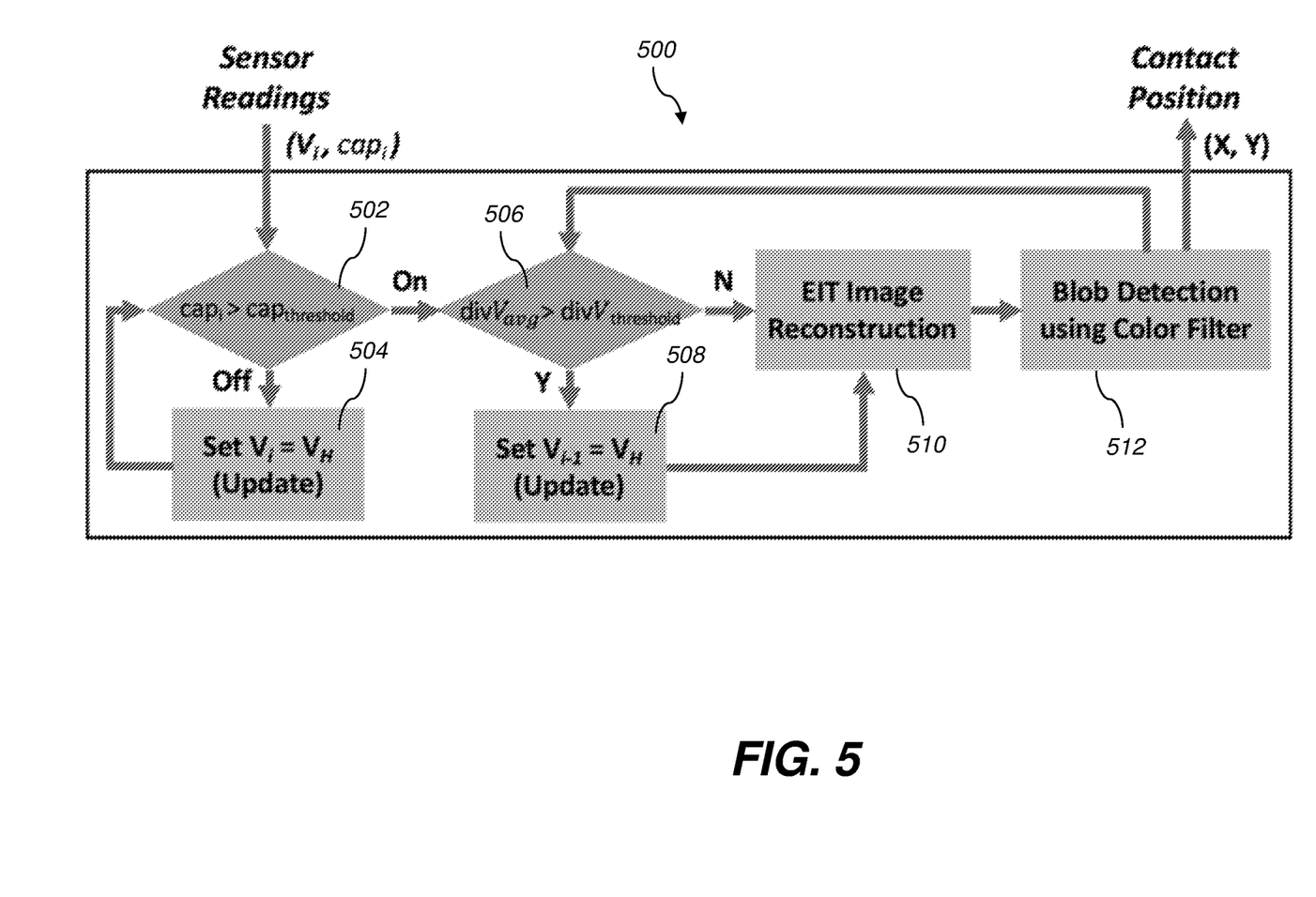
FIG. 5 is a process flowchart illustrating a baseline update process according to one embodiment.
Figure 6:
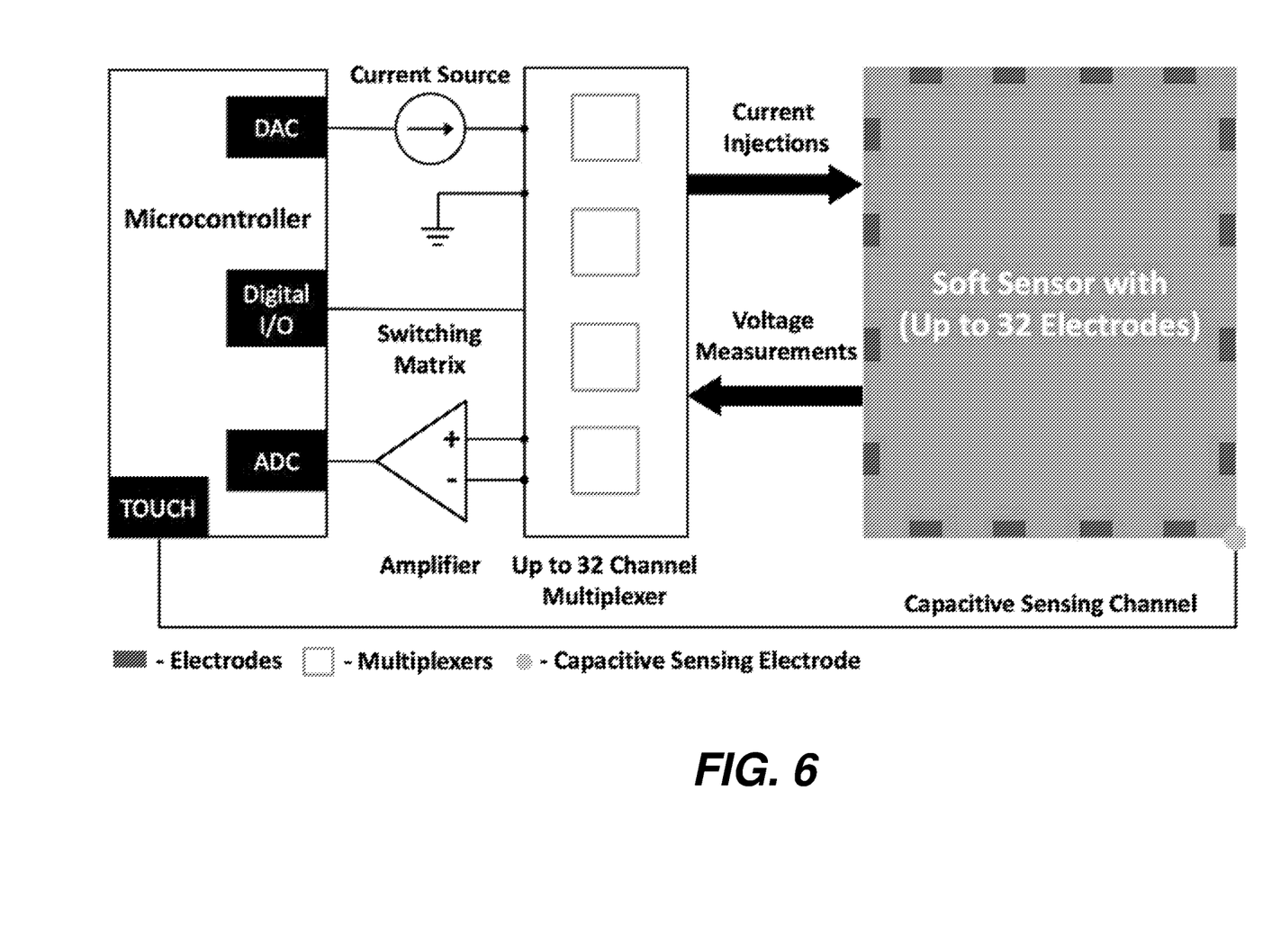
FIG. 6 shows a schematic view of a 16-electrode system.

FIG. 5 shows a flowchart 500 which illustrates a baseline update process. First, if a contact is not detected, i.e., the capacitive sensing value cap, is less than a predetermined threshold $cap_{threshold}$ (stage 502), instant measurement readings (Vi) are set as a homogeneous baseline data ($V_H$) (stage 504). If $cap_i \geq cap_{threshold}$, a movement detection is evaluated (stage 506). If $div\ V_{avg,i} \geq div\ V_{avg}$ threshold, the system sets the previous frame's data ($V_{i-1}$) as VH (stage 508) and proceeds to perform an image reconstruction using EIT (stage 510). If $div\ V_{avg,i} < div\ V_{avg}$ threshold, the system directly proceeds to stage 410 and performs an image reconstruction using EIT. The system may optionally apply a color filter to the reconstructed image for blob detection and localize a contact coordinate from the center of the blob (stage 512) before outputting the contact position (x, y).

Throughout this description, some aspects are described in terms that would ordinarily be implemented as software programs. Those skilled in the art will readily recognize that the equivalent of such software can also be constructed in hardware, firmware, or micro-code. Because data-manipulation algorithms and systems are well known, the present description is directed in particular to algorithms and systems forming part of, or cooperating more directly with, systems and methods described herein. Other aspects of such algorithms and systems, and hardware or software for producing and otherwise processing signals or data involved therewith, not specifically shown or described herein, are selected from such systems, algorithms, components, and elements known in the art. Given the systems and methods as described herein, software not specifically shown, suggested, or described herein that is useful for implementation of any aspect is conventional and within the ordinary skill in such arts.

Figure 7:
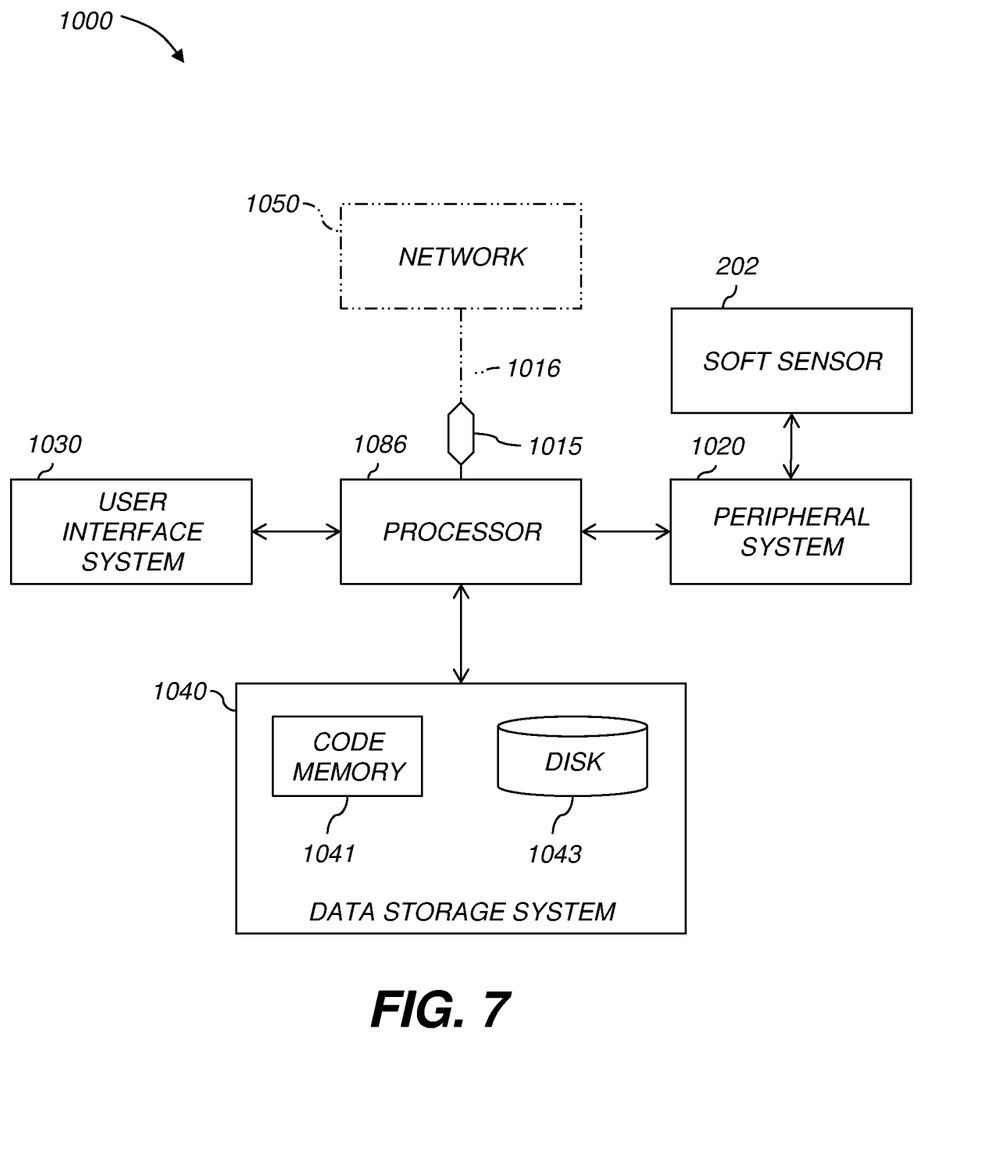
FIG. 7 illustrates a high-level diagram showing the components of a sensing system.

FIG. 7 is a high-level diagram showing the components of the exemplary system 1000 for analyzing the EIT location data and performing other analyses described herein, and related components. The system 1000 includes a processor 1086, a peripheral system 1020, a user interface system 1030, and a data storage system 1040. The peripheral system 1020, the user interface system 1030 and the data storage system 1040 are communicatively connected to the processor 1086. Processor 1086 can be communicatively connected to network 1050 (shown in phantom), e.g., the Internet or a leased line, as discussed below. The EIT data may be received using sensor 202 (via electrodes 204) and/or displayed using display units (included in user interface system 1030) which can each include one or more of systems 1086, 1020, 1030, 1040, and can each connect to one or more network(s) 1050. Processor 1086, and other processing devices described herein, can each include one or more microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs).

Processor 1086 can implement processes of various aspects described herein. Processor 1086 can be or include one or more device(s) for automatically operating on data, e.g., a central processing unit (CPU), microcontroller (MCU), desktop computer, laptop computer, mainframe computer, personal digital assistant, digital camera, cellular phone, smartphone, or any other device for processing data, managing data, or handling data, whether implemented with electrical, magnetic, optical, biological components, or otherwise. Processor 1086 can include Harvard-architecture components, modified-Harvard-architecture components, or Von-Neumann-architecture components.

The phrase "communicatively connected" includes any type of connection, wired or wireless, for communicating data between devices or processors. These devices or processors can be located in physical proximity or not. For example, subsystems such as peripheral system 1020, user interface system 1030, and data storage system 1040 are shown separately from the data processing system 1086 but can be stored completely or partially within the data processing system 1086.

The peripheral system 1020 can include one or more devices configured to provide digital content records to the processor 1086. For example, the peripheral system 1020 can include digital still cameras, digital video cameras, cellular phones, or other data processors. The processor 1086, upon receipt of digital content records from a device in the peripheral system 1020, can store such digital content records in the data storage system 1040.

The user interface system 1030 can include a mouse, a keyboard, another computer (connected, e.g., via a network or a null-modem cable), or any device or combination of devices from which data is input to the processor 1086. The user interface system 1030 also can include a display device, a processor-accessible memory, or any device or combination of devices to which data is output by the processor 1086. The user interface system 1030 and the data storage system 1040 can share a processor-accessible memory.

In various aspects, processor 1086 includes or is connected to communication interface 1015 that is coupled via network link 1016 (shown in phantom) to network 1050. For example, communication interface 1015 can include an integrated services digital network (ISDN) terminal adapter or a modem to communicate data via a telephone line; a network interface to communicate data via a local-area network (LAN), e.g., an Ethernet LAN, or wide-area network (WAN); or a radio to communicate data via a wireless link, e.g., WiFi or GSM. Communication interface 1015 sends and receives electrical, electromagnetic or optical signals that carry digital or analog data streams representing various types of information across network link 1016 to network 1050. Network link 1016 can be connected to network 1050 via a switch, gateway, hub, router, or other networking device.

Processor 1086 can send messages and receive data, including program code, through network 1050, network link 1016 and communication interface 1015. For example, a server can store requested code for an application program (e.g., a JAVA applet) on a tangible non-volatile computer-readable storage medium to which it is connected. The server can retrieve the code from the medium and transmit it through network 1050 to communication interface 1015. The received code can be executed by processor 1086 as it is received, or stored in data storage system 1040 for later execution.

Data storage system 1040 can include or be communicatively connected with one or more processor-accessible memories configured to store information. The memories can be, e.g., within a chassis or as parts of a distributed system. The phrase "processor-accessible memory" is intended to include any data storage device to or from which processor 1086 can transfer data (using appropriate components of peripheral system 1020), whether volatile or nonvolatile; removable or fixed; electronic, magnetic, optical, chemical, mechanical, or otherwise. Exemplary processor-accessible memories include but are not limited to: registers, floppy disks, hard disks, tapes, bar codes, Compact Discs, DVDs, read-only memories (ROM), erasable programmable read-only memories (EPROM, EEPROM, or Flash), and random-access memories (RAMs). One of the processor-accessible memories in the data storage system 1040 can be a tangible non-transitory computer-readable storage medium, i.e., a non-transitory device or article of manufacture that participates in storing instructions that can be provided to processor 1086 for execution.

In an example, data storage system 1040 includes code memory 1041, e.g., a RAM, and disk 1043, e.g., a tangible computer-readable rotational storage device such as a hard drive. Computer program instructions are read into code memory 1041 from disk 1043. Processor 1086 then executes one or more sequences of the computer program instructions loaded into code memory 1041, as a result performing process steps described herein. In this way, processor 1086 carries out a computer implemented process. For example, steps of methods described herein, blocks of the flowchart illustrations or block diagrams herein, and combinations of those, can be implemented by computer program instructions. Code memory 1041 can also store data, or can store only code.

Various aspects described herein may be embodied as systems or methods. Accordingly, various aspects herein may take the form of an entirely hardware aspect, an entirely software aspect (including firmware, resident software, micro-code, etc.), or an aspect combining software and hardware aspects These aspects can all generally be referred to herein as a "service," "circuit," "circuitry," "module," or "system."

Furthermore, various aspects herein may be embodied as computer program products including computer readable program code stored on a tangible non-transitory computer readable medium. Such a medium can be manufactured as is conventional for such articles, e.g., by pressing a CD-ROM. The program code includes computer program instructions that can be loaded into processor 1086 (and possibly also other processors), to cause functions, acts, or operational steps of various aspects herein to be performed by the processor 1086 (or other processor). Computer program code for carrying out operations for various aspects described herein may be written in any combination of one or more programming language(s), and can be loaded from disk 1043 into code memory 1041 for execution. The program code may execute, e.g., entirely on processor 1086, partly on processor 1086 and partly on a remote computer connected to network 1050, or entirely on the remote computer.

Those skilled in the art will recognize that numerous modifications can be made to the specific implementations described above. The implementations should not be limited to the particular limitations described. Other implementations may be possible.

What is claimed is:

1. A sensing system, comprising:
   a stretchable base material having a resistance distribution that changes in response to being mechanically deformed as a result of a human body contact, the base material having a rebound elasticity;
   a plurality of electrodes attached to a perimeter of the base material;
   a capacitive sensing channel attached to the base material; and
   a controller operatively connected to the plurality of electrodes and the capacitive sensing channel, the controller configured to,
      measure instantaneous voltage measurements from the plurality of electrodes;
      determine whether the base material is mechanically deformed based on the instantaneous voltage measurements using a support vector machine classifier.

2. The sensing system of claim 1, wherein the controller is further configured to:

while the base material is not mechanically deformed, (i) determine voltage differences between the instantaneous voltage measurements and a homogenous baseline voltage and (ii) determine a location of the human body contact using electrical impedance tomography (EIT).

3. The sensing system of claim 2, wherein the controller is further configured to:

determine the homogenous baseline voltage based on instantaneous voltage measurements from the plurality of electrodes while the base material is not mechanically deformed.

4. The sensing system of claim 2, wherein the controller is further configured to:

begin adaptively updating a baseline EIT measurement when the human body contact with the base material begins; and stop updating the baseline EIT measurement when the human body contact with the base material ends.

5. The sensing system of claim 4, wherein the controller is further configured to:

measure capacitance measurements from the capacitive sensing channel; and determine a beginning and ending of the human body contact based on the capacitance measurements.

6. The sensing system of claim 1, wherein the base material comprises a carbon filled elastomer.

7. The sensing system of claim 1, wherein the controller utilizes a neighboring method to measure the instantaneous voltage measurements from the plurality of electrodes, said neighboring method comprising:

a) measuring a first voltage differential between a first adjacent pair of electrodes in the plurality of electrodes;

b) measuring a second voltage differential between a second adjacent pair of electrodes in the plurality of electrodes, the first and second adjacent pairs of electrodes having a common electrode; and c) continuing to measure voltage differentials between successive neighboring pairs of the electrodes until all adjacent pairs of the electrodes have been evaluated for their voltage differential.

8. The sensing system of claim 1, wherein the controller is further configured to:

determine an image reconstruction of the location and shape of the human body contact using electrical impedance tomography; and apply a color filter to the image reconstruction to localize a contact coordinate of the location of the human body contact.

9. The sensing system of claim 1, wherein the base material is imprinted with graphics to indicate control buttons of a device user control interface.

10. The sensing system of claim 1, wherein the plurality of electrodes are evenly spaced along the perimeter of the base material.

11. The sensing system of claim 1, further comprising:

a current source connected between the controller and the plurality of electrodes.

12. The sensing system of claim 1, further comprising:

an amplifier connected in a return path from the plurality of electrodes to the controller.

13. The sensing system of claim 1, the controller being further configured to:

while the base material is mechanically deformed, determine a deformation level using a support vector machine regression.

* * * * *